(12) United States Patent
Murray

(10) Patent No.: US 8,366,855 B2
(45) Date of Patent: Feb. 5, 2013

(54) AUTOMATED MACHINE AND METHOD FOR MOUNTING A FITMENT TO A FLEXIBLE POUCH

(75) Inventor: R. Charles Murray, Sarasota, FL (US)

(73) Assignee: PPI Technologies Global, LLC, Sarasota, FL (US)

( * ) Notice: Subject to any disclaimer, the term of this patent is extended or adjusted under 35 U.S.C. 154(b) by 45 days.

(21) Appl. No.: 13/036,981

(22) Filed: Feb. 28, 2011

(65) Prior Publication Data

US 2011/0152051 A1    Jun. 23, 2011

Related U.S. Application Data

(63) Continuation-in-part of application No. 12/440,956, filed as application No. PCT/US2007/078291 on Sep. 12, 2007, now abandoned.

(60) Provisional application No. 60/825,321, filed on Sep. 12, 2006.

(51) Int. Cl.
    *B29C 65/00* (2006.01)
    *B32B 37/00* (2006.01)
    *B32B 38/04* (2006.01)

(52) U.S. Cl. ....... 156/252; 156/73.1; 156/249; 156/464; 156/514; 156/541; 156/552; 493/196; 493/201; 493/213; 53/456; 53/469; 53/473

(58) Field of Classification Search ................. 156/464, 156/514, 552, 73.1, 249, 252, 541; 493/213, 493/196, 201; 53/456, 469, 473
See application file for complete search history.

(56) References Cited

U.S. PATENT DOCUMENTS

| | | | |
|---|---|---|---|
| 4,397,410 A * | 8/1983 | Schueler | 225/98 |
| 4,574,559 A | 3/1986 | Rutter et al. | |
| 4,846,915 A * | 7/1989 | Keeler et al. | 156/261 |
| 6,199,601 B1 | 3/2001 | Laudenberg | |
| 2006/0196784 A1 | 9/2006 | Murray | |

FOREIGN PATENT DOCUMENTS

GB     2293134 A     3/1996

* cited by examiner

*Primary Examiner* — Linda L Gray
(74) *Attorney, Agent, or Firm* — Gifford, Krass, Sprinkle, Anderson & Citkowski, P.C.

(57) ABSTRACT

A machine for forming a flexible pouch having a spout fitment includes a frame, a transport device adjacent the frame for transporting a flexible material therealong, and a feeder device for supplying a roll of tape material having a plurality of fitments secured thereto. A fitment insertion station receives the roll of tape material with pre-applied fitments, and removes the fitment, and seals the fitment to a fitment receiving portion of the flexible material. A pouch body forming station operatively forms a body of the pouch from the flexible material, and an upper edge, a lower edge and a side edge extending therebetween.

14 Claims, 8 Drawing Sheets

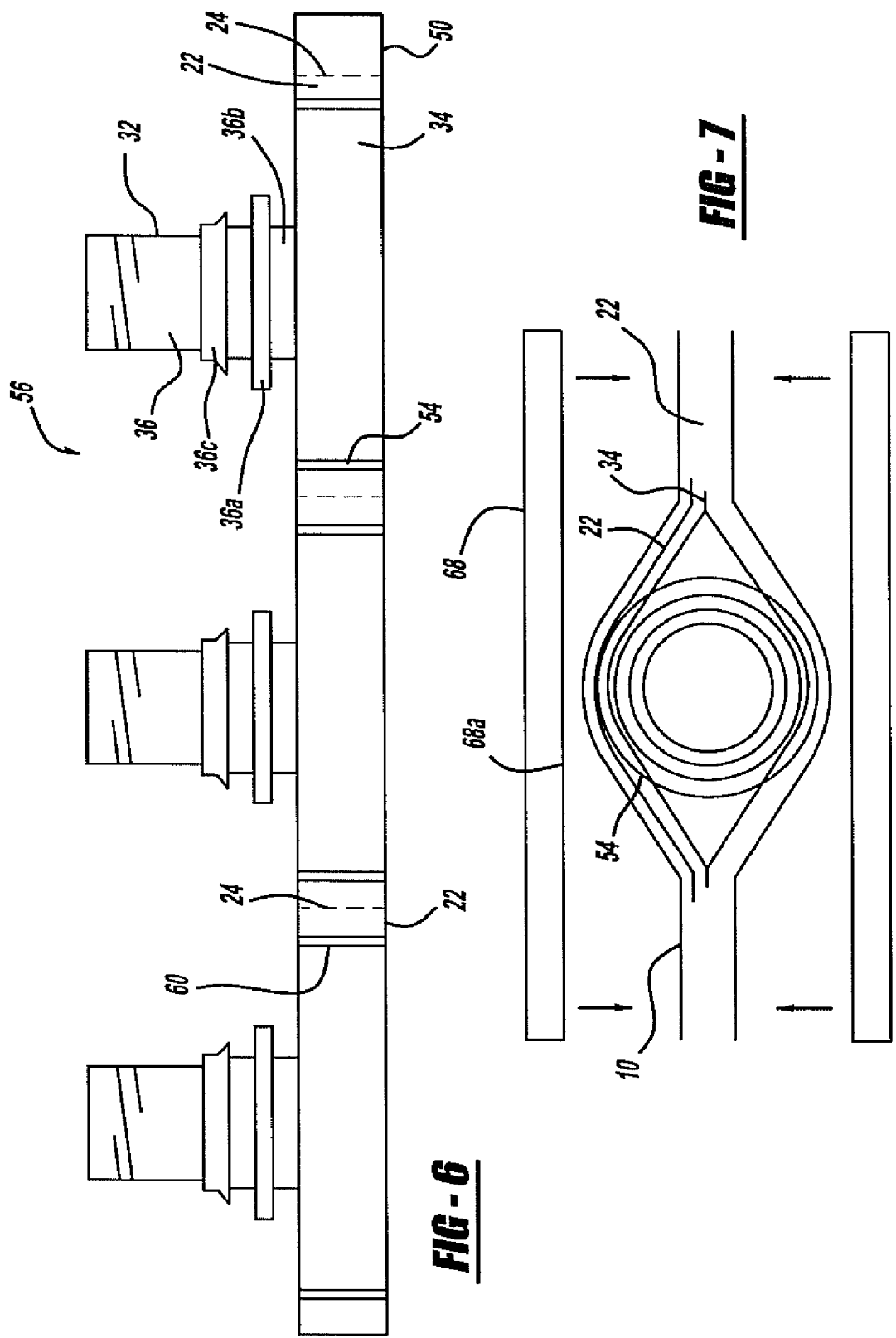

AUTOMATED MACHINE AND METHOD FOR MOUNTING A FITMENT TO A FLEXIBLE POUCH

This application is a Continuation-in-part of application Ser. No. 12/440,956 filed on Mar. 12, 2009 now abandoned. Application Ser. No. 12/440,956 claims the benefit of Application PCT/US2007/078291 Sep. 12, 2007, which claims the benefit of U.S. Provisional Application 60/825,321 filed on Sep. 12, 2006.

BACKGROUND OF THE INVENTION

1. Field of the Invention

The present invention relates generally to a flexible pouch for packaging products, and more particularly to a flexible pouch with a fitment, and a machine and method of manufacture for mounting the fitment.

2. Description of the Related Art

Various types of disposable, portable containers are known in the art for storing a fluid or dry product, such as a liquid, granular material, powder or the like. An example of such a container is a flexible pouch. Consumers prefer the convenience of flexible pouches over other types of containers, due to their shape, size, shelf life and storage adaptability. Manufacturers recognize the packaging benefits of a flexible pouch, since the pouch can be formed and filled on the same manufacturing line. An example of a method and apparatus for filling a flexible pouch with a product is disclosed in commonly assigned U.S. Pat. No. 6,199,601, which is incorporated herein by reference.

The flexible pouch is made from a flexible material, such as an extrusion or a laminate composed of sheets of plastic or aluminum or the like. An outer layer of the material may have preprinted information, such as a logo or the like, to provide the consumer with information regarding the contents of the pouch. The material is available in sheet form, on a roll, and a plurality of pouches may be fabricated from one width of the roll. The pouch also includes an opening means for accessing the contents of the pouch, such as a fitment.

The pouch may be formed using conventionally known manufacturing techniques, such as a horizontal form-fill-seal machine with single or multiple lanes, a flat bed pre-made pouch machine, a vertical form-fill-seal machine, or the like. The machine includes a number of stations, with a particular operation or operations taking place at each station. The pouch is generally formed by folding a sheet or sheets of material over each other to achieve a predetermined shape. The pouch may also include an insert or gusset positioned between two parallel edges to form a pouch capable of standing unsupported. Edges, such as a side edge, may be joined together using a sealing technique such as bonding or welding. The opening means, such as a fitment, may be sealed between edges, such as the upper edges of the pouch. Alternatively, an upper edge of the front panel and back panel may not be sealed until after the pouch is filled. The pouch is ready to be filled, sealed and finished as required. The pouch may be filled through the fitment, or through an unsealed edge.

While flexible pouches with fitments work well, they are costly to produce since each fitment is individually applied to the pouch and sealed. Thus, there is a need in the art for an improved machine that produces a flexible pouch with a fitment, and an improved method of making such a flexible pouch, that applies the fitment in a more reliable manner, and at lower cost.

SUMMARY OF THE INVENTION

Accordingly, a flexible pouch for a product, a machine, and a method of manufacturing the flexible pouch is provided. The flexible pouch includes a panel having an upper edge, a lower edge and a side edge extending therebetween the upper edge and the lower edge. A fitment and a tape of material are sealed to the panel.

A machine for forming a flexible pouch having a spout fitment includes a frame, a transport device adjacent the frame for transporting a laminate material therealong, and a feeder device for supplying a roll of tape material having a plurality of fitments spaced a predetermined distance apart. A fitment insertion station receives the roll of tape material with pre-applied fitments, and removes the fitment, and seals the fitment to a fitment receiving portion of the flexible material. A pouch body forming station operatively forms a body of the pouch from the flexible material.

One advantage of the present invention is that an improved flexible pouch with fitment and method and machine for making the same is provided with more reliable placement and sealing of the fitment. Another advantage of the present invention is that the improved method and machine for making the pouch supplies multiple fitments across the lanes of material, to increase the line speed for applying the fitment to the pouch. Still another advantage of the present invention is that the size of the fitment can be reduced, due to the improved seal around the fitment. A further advantage of the present invention is that the inclusion of material roll tape with the fitment improves the seal between the fitment and the walls of the pouch by eliminating any potential gap around the seal area. Yet a further advantage of the present invention is that the improved method and machine for making the pouch flexible pouch provides for a flexible pouch that is more cost effective to produce.

BRIEF DESCRIPTION OF THE DRAWINGS

FIG. 6 is aside view of a fitment tape, according to the present invention.

FIG. 7 is a top view of a sealing operation for sealing the fitment to the pouch; according to the present invention.

DETAILED DESCRIPTION OF THE PREFERRED EMBODIMENTS

Figure 1:
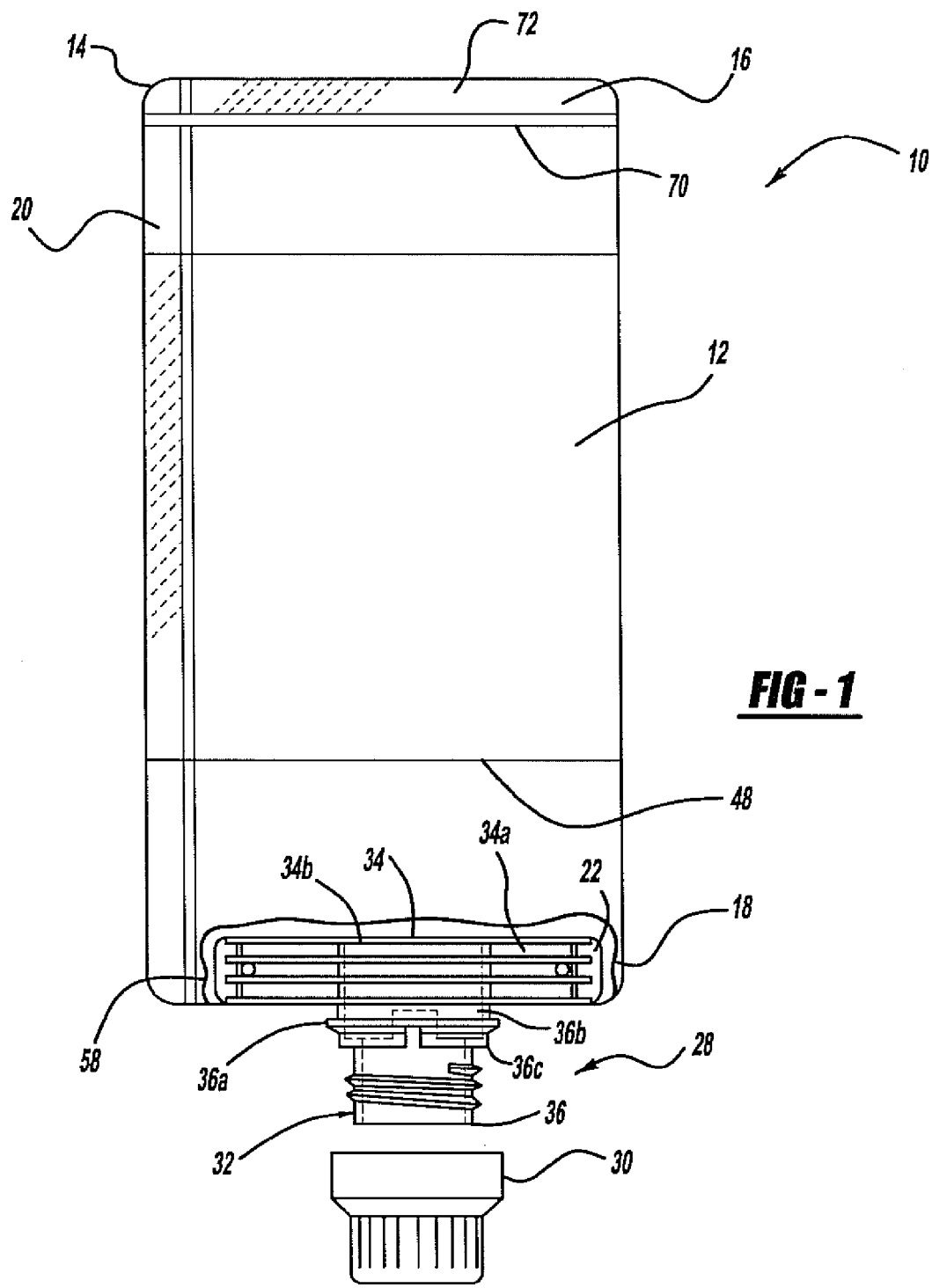
FIG. 1 is an elevational view of a flexible pouch with a fitment, according to the present invention.
Figure 2:
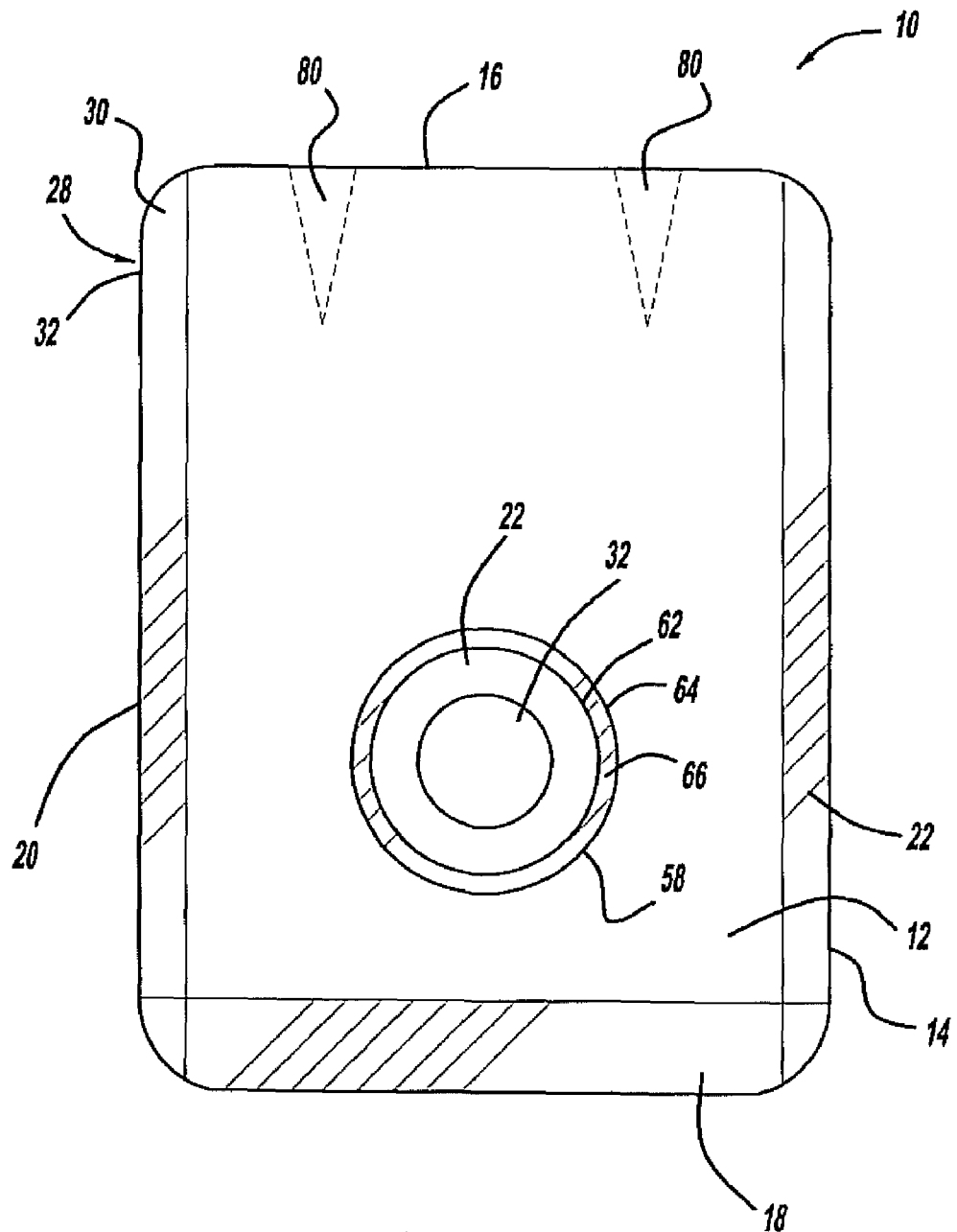
FIG. 2 is another elevational view of a flexible pouch with a fitment, according to the present invention.
Figure 3:
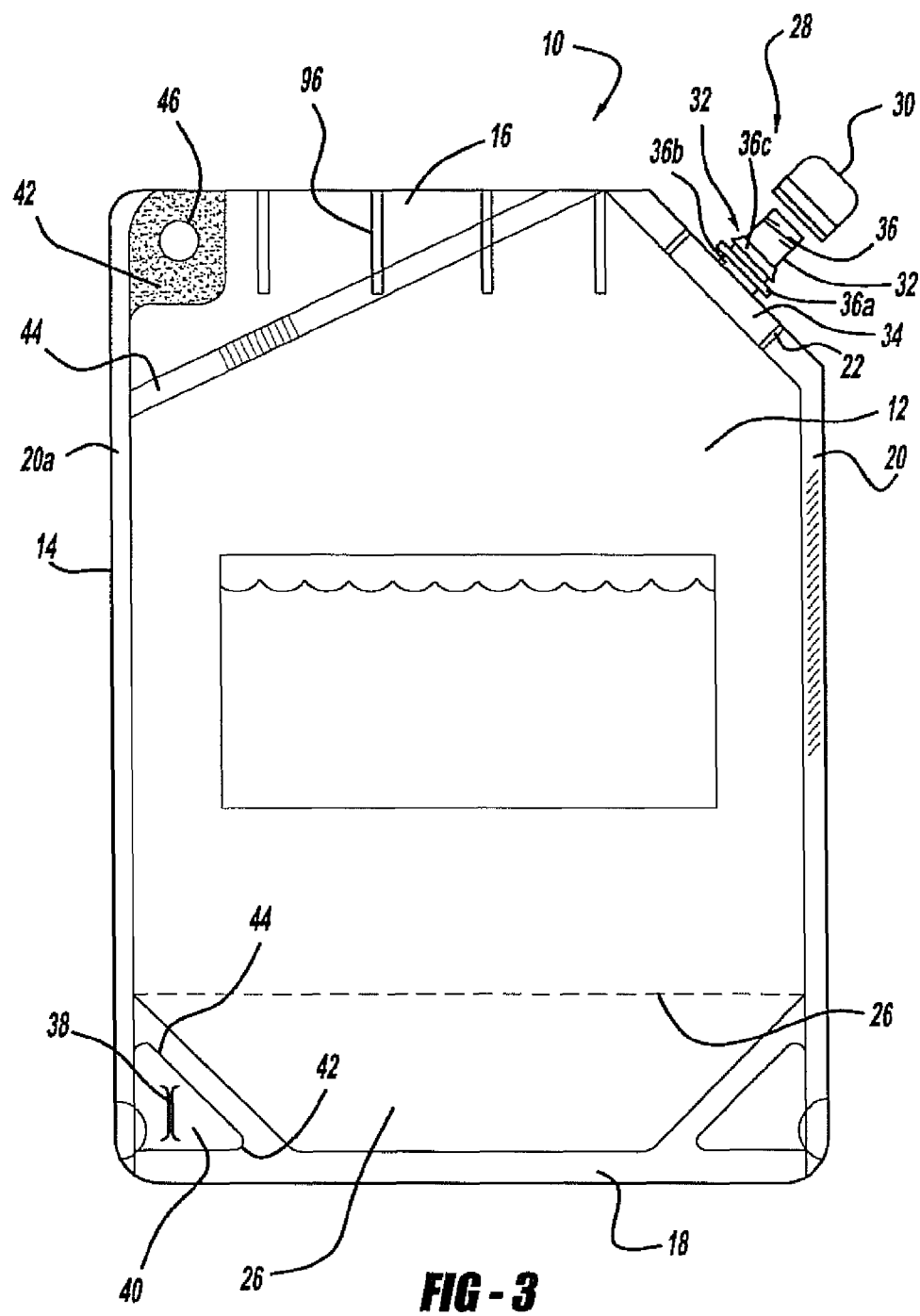
FIG. 3 is a further view of a flexible pouch with a fitment, according to the present invention.

Referring to FIGS. 1-3, a flexible pouch 10 is illustrated. The filled pouch may assume various shapes, such as cylindrical, cube, conical, spherical, or the like. The type of product and usage of the pouch influences the shape. The type of product is unlimited, and could have a solid or a liquid form. The pouch 10 may form one compartment for the product. Alternatively, the pouch 10 may include multiple discrete compartments. An example of such a pouch is disclosed in commonly assigned U.S. patent application Ser. No. 11/367,613, which is incorporated herein by reference.

The flexible pouch 10 is preferably formed from a roll of flexible, preprinted laminate material. The choice of laminate material is nonlimiting, and is influenced by factors such as the product contained in the pouch 10, the shape of the pouch or the anticipated use of the pouch. Preferably, the laminate is either a three, four, five or more gauge material, and the outer layer is preprinted. It should be appreciated that a portion of the material may be a clear laminate, in order to view the contents of the pouch. For example, the laminate material may include at least one layer of virgin polyethylene terephthalate (PET) and at least one layer of aluminum foil (AL) and another layer such as EVOH, PET, polyethylene, or polypropylene or nylon or the like. The laminate may also include a metalized foil paper layer laminated to a cast polypropylene layer and another layer of PET, polyethylene or EVOH. It should be appreciated that there may be a fourth layer of nylon. Another material example includes a cast polypropylene (CPP) layer, a polyethylene (PET) layer, a foil (AL) layer, a nylon (ONO) layer and another CPP layer. Another example of a material structure is the use of nylon, foil, nylon, and cast polypropylene (ONO/AL/ONO/CPP) or CPP/NY/AL/CPP. A further example of a laminate material structure is CPP/AL/ONO/PE. This structure works well when the product has a short shelf life, and the nylon eliminates stretching or cracking of the AL layer. Advantageously, a pouch 10 made using the cast polypropylene laminate material retains its filled shape even as the product is removed from the pouch 10. It should be appreciated that if a filled carbonated pouch is stored at ambient temperature, the laminate will start to creep after a period of time, such as ten days. The laminate material may include an extrusion layer to contain "creepage" or "stretch" of the film after filling due to carbonation expansion, if the product is carbonated. The laminate material may include another layer of sealable material, such as LDPE, to facilitate sealing. In addition, the selected material may be organoleptic compliant in order to avoid the transfer of odor contaminants to the product, or product contamination during the shelf life period of the product.

The pouch 10 itself is defined by a panel 206, which may be formed using one or more sheets of material. In this example, the pouch 10 includes a front wall 12 and a back wall 14, and the edges are joined along a seam. With one sheet of material, it is folded so that the outer edges are joined together to form one seam. In another example, the pouch may be formed from two facing panels of material that are joined together along corresponding side edges.

Further, the pouch is defined by an upper edge 16, an opposed lower edge 18, and at least one side edge 20 extending therebetween the upper and lower edges 16, 18. The edges of the pouch may be shaped, such as linear or curvilinear or the like. For example, the upper edge may include an elongated spout or neck portion.

The edges of the pouch 10 are sealed using heat or ultrasonics or by a combination of heat and ultrasonics. The pouch sealed edges form a seam. The seam may be a fin-style seam, or a flat seam or the like. A side edge seal may extend into a predetermined portion of the upper edge of the pouch, and a predetermined portion of the closing seal may overlap a predetermined portion of the side seal.

The pouch 10 may include a sidewall. The sidewall 26 advantageously allows the pouch 10 to acquire another shape, such as cylindrical, or to stand upright. The sidewall 26 may be integrally formed in the panel as a gusset or a separate piece of material as an insert. The sidewall may be located between the side edges of the panels, between the lower edges, between the upper edges, or a combination thereof. The sidewall may be generally wider at the lower edge and taper upwardly towards the upper edge, or be of a uniform dimension. The sidewall may be formed between the lower edges of the pouch 10 to provide a base for the pouch 10 to stand upright. A sidewall formed between the side or upper edges may also serve as an area for receiving an opening means.

In an example of a sidewall forming a gusset between the lower edges of the pouch, the inner surface of the gusset may have a curvilinear shape, such as parabolic, concave or the like. For a pouch having a predetermined size the rounded shape may be advantageous in opening and filling of the pouch, since a reduced amount of air may be utilized to open the pouch, depending on the size of the pouch of seals.

The pouch 10 further includes an opening means 28 for accessing the contents of the pouch. Various types of opening means 28 are known in the art for this purpose. It should be appreciated that in this example the opening means may be applied prior to filling the pouch. The pouch 10 may be filled through an open edge of the pouch or through the spout.

In this example, the opening means 28 is a spout fitment 32. The spout fitment 32 may be mounted between edges of the panel 206, such as an upper edge, or side edge or lower edge, or on a surface of the panel 206, or the like. Various types of fitments are considered, such as a cap 30 enclosing an opening of a spout fitment 32. The spout fitment 30 includes a base portion 34, and an upwardly projecting tubular portion or spout 36. The cap 30 may be removably or replaceably secured to the spout 36, or partially secured to the spout 36 or the like. The cap 30 can be of various shapes, such as a traditional round shape. In another example, the cap can have an elongated oval shape, so that the pouch may stand up on its own. The base 34 or canoe portion of the fitment includes a vertically extending wall 34a. In this example, the base portion 34 has an elongated oval shape, although other shapes are contemplated. The base 34 may also include a ribs 34b protruding outwardly from the wall 34a. The base 34 may be fixedly retained to the pouch using a sealing means. In another example, an intermediate material 22 surrounds the base 34. The intermediate material 22 may be a similar laminate material as the pouch material. An outer layer or the intermediate material 22 may include a sealable membrane, such as LDPE. In an example, the intermediate material 22 is provided as a material tape having the fitment pre-applied thereto in a manner to be described. During fabrication of the pouch 10, one edge of the intermediate material 22 is sealed to the fitment, and another edge of the intermediate material is sealed to the pouch 10. In another example, the intermediate material 22 is positioned in the seal area of the pouch, and the fitment is positioned on the panel. The seal may be an ultrasonic seal, or a heat weld, or the like. During sealing, the intermediate material flows around the base portion 34 and fills in any void between the panel wall and the fitment, to increase the retention of the base portion to the panel 206.

The spout 36 may include at least one outwardly extending flange or collar 36a. The flange 36a may be spaced a predetermined distance above the base portion 34, and the space in between provides a tool support surface 36b. For example, the tool support surface 36b is used to support the pouch 10 during manufacturing operations, such as filling, sealing or the like. The spout 36 may include another flange 36c parallel to, and spaced a predetermined distance above the first flange 36a. The flanges serve other purposes, such as a "stop" for the cap 30, or for a tamperproof feature of the cap.

The cap and spout can be made from a variety of materials. For example, the cap may be made from plastic, such as reground resins. The spout may be made of polypropylene (PP), depending on the product. The spout portion of the fitment may include a removable seal (not shown) to prevent leakage of the product or evidence of tampering. If the product is a carbonated product, the spout fitment may include a carbonation insert and oxygen scavenger to reduce oxygen in the head space. An example of a fitment for a carbonated product is disclosed in commonly assigned U.S. patent application Ser. No. 11/551,071.

It should be appreciated that the flexible pouch 10 may advantageously include other features that are known in the art. For example, the pouch may include a tracking device 38 feature integrally located within the pouch 10 that includes electronic tracking information relevant to the pouch 10, as described in commonly assigned U.S. Pat. No. 7,658,286, which is incorporated by reference. The tracking device 38 may be an electronic tag, such as a Radio Frequency Identification (RFID) transmitter. The tracking device 38 can store a predetermined amount of electronic information. An example of the information is unique tracking information for a particular package 10. For example, the tracking device 38 can provide information about the status of the pouch 10, such as physical location of the pouch 10, or age of the pouch 10 or the like. In addition, the tracking device 38 can be utilized for inventory control, delivery, purchase behavior, returns, pricing, and other tracking purposes. The tracking device 38 is in communication with a receiver (not shown) for reading the information. The receiver may be a computer system having a memory and a processor, a handheld device for receiving an RFID signal, or any other type of device capable of electronic communication with the tracking device 38. The receiver may be a transceiver capable of emitting a radio signal that initiates transmission of information from the tracking device 38. Although the packages are individually read, the RFID tag may be advantageously read at a faster rate than using a barcode in conjunction with a barcode scanner, since the packages are not physically scanned on an individual basis. In addition, the signal from the RFID tag may be advantageously read through an outer layer of material, such as a packaging material, or under various environmental conditions. Another advantage is that the tracking of the physical location of the package may be electronically monitored within a predetermined geographical range.

The tracking device 38 may be integrally embedded in the pouch 10. For example, a plurality of apertures 42 may be punched in the folded area of the gusset 26 to reduce the amount of material in the gusset 26. The tracking device 38 may be inserted in an air pocket 40 formed within one of the gusset apertures 42. The inclusion of the tracking device 38 in the air pocket 40 is advantageous because it improves the signal strength of the tracking device 38. Alternatively, the tracking device 38 may be inserted in a sealed portion of the pouch, and an air pocket 40 is formed around the tracking device 38 during application of the seal. The tracking device may be integrally formed in the opening means.

The pouch 10 may include a feature such as an angled top seal 44 extending between a first side edge and a predetermined location on the upper edge 16 of the pouch. The angled top seal 44 facilitates the removal of product from the pouch 10 by directing the flow of the product towards the opening means. An example of such a pouch is disclosed in commonly assigned U.S. patent application Ser. No. 11/683,133 which is incorporated herein by reference.

The pouch 10 may include a feature such as a hanging aperture 46 located within an edge, such as an upper edge or side edge. The aperture 46 may have various shapes, such as round or curved. The pouch 10 may be supported by a support means, such as a hook that extends through the aperture 46. The pouch 10 may be hung for display or storage purposes. The positioning of the hanging aperture 46 above the angled top seal 44 or within a sealed portion prevents the contents of the pouch from leaking out through the aperture 46.

The pouch may include a feature such as a guide pocket 80 formed in a wall 14, 16 of the pouch 10 prior to filling and sealing, to facilitate the separation of the front and back walls 14, 16 prior to the filling of the pouch 10. An example of such a pouch is disclosed in commonly assigned U.S. patent application Ser. No. 10/310,221. In a further example, the pouch may contain a rib 96 that adds strength or support or form to the body of the pouch. The rib 96 may be thermoformed. In still another example, the pouch may include a frangible seal. An example of a pouch with a frangible seal is disclosed in commonly assigned U.S. patent application Ser. No. 11/367,613 which is incorporated herein by reference.

The pouch may include a feature such as an integral vent means. The vent means, such as a valve, functions to exhaust a gas from the pouch. The gas may be formed within the package while heating the pouch. The valve may also be operable to respire gas formed in the compartment 36 for other reasons, such as gas formed by decaying food or during freezing or the like. The valve remains tightly closed, until pressure from the gas, such as steam, reaches a predetermined pressure value. The valve opens and remains open, to release the gas or stream from the package in a controlled manner. Various types of valves are contemplated. For example, a tape may be used to cover a hole in the wall. Alternatively, a pressure relief device, such as that manufactured by PPI Technologies Global, Sarasota, Fla. model number P033F, may be utilized. Another example of a valve is disclosed in commonly assigned U.S. patent application Ser. No. 10/228,430 and U.S. Pat. No. 7,240,796 and PCT Patent Application No. PCT/US2004/34361 which is incorporated herein by reference.

The pouch may include a feature such as an ergonomic shape. An example of an ergonomically shaped pouch for a carbonated beverage is disclosed in commonly assigned U.S. patent application Ser. No. 11/454,241 which is incorporated herein by reference. The ergonomic shape may be achieved through carbonation as the pouch 10 is filled with a carbonated product, since the carbonation causes the pressure within the pouch to increase.

The flexible pouch 10 may include a feature such as an outer layer or sleeve 48 covering the outer surface of the pouch. The sleeve may be a label containing information about the product, such as a barcode or the like. The sleeve may cover only a portion of the pouch outer surface. Preferably, the sleeve is shrunk over the outer surface of the pouch 10 after the pouch 10 is formed and filled with the product. The sleeve 48 is advantageous because it covers the side seam. It also adds one or more layers of material to strengthen the pouch and improve its durability. Various types of material may be utilized for the sleeve, such as paper or plastic including PET or PVC and the choice is non-limiting.

It is contemplated that the filled pouch 10 may undergo a secondary process. For example, the filled pouch may be refrigerated, frozen or otherwise modified for an extended shelf life. Alternatively, the filled pouch may be pasteurized for increased shelf life. Examples of pasteurized food products include dairy products such as milk, or meat products such as chicken or the like.

It is contemplated that these are merely examples of features and the flexible pouch 10 may incorporate any of the above-described features or any other feature, in any combination. In addition, the finished pouch may assume various shapes, such as cylindrical, cubical, spherical, conical, hourglass or the like, as influenced by the type of product and intended usage of the pouch. It should further be appreciated that the designated upper edge and lower edge is merely for reference purposes.

Figure 9:
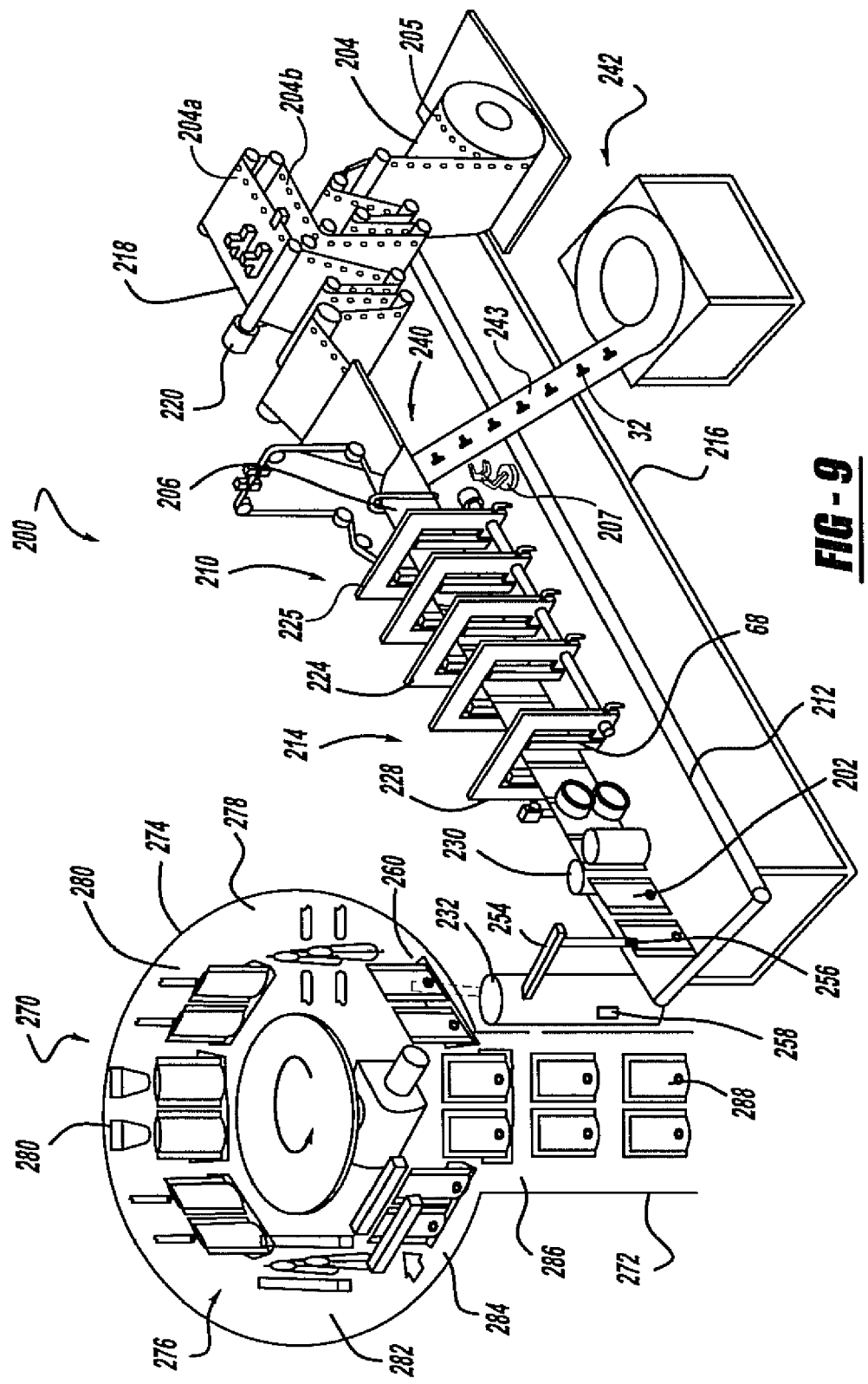
FIG. 9 is a perspective view of a machine for forming a pouch from a sheet of flexible material.

With reference now to FIG. 9, a machine 200 for forming the pouch 10 is provided. The pouch is formed a sheet of flexible material 204. The machine 200 may include a form line 210 and a fill-seal line 270. The form line 210 is operable to form the sheet of flexible material 204 into a pouch 10. The fill-seal line 270 is operable to fill the pouch 10 and seal the filled pouch 10.

The sheet of flexible material 204 may be formed in a roll and fed to the machine 200. The sheet of flexible material 204 has an inner surface 204a opposite an outer surface 204b. The sheet of flexible material includes a plurality of apertures 205 axially aligned with each other. Each of the plurality of apertures 205 evenly spaced apart from each other. The each of the plurality of apertures 205 is disposed along the sheet of flexible material 204 where the fitment 32 is mounted on the pouch 10. Though the plurality of apertures 205 is shown disposed along an edge of the sheet of flexible material 204, it should be appreciated that the apertures 205 may be disposed on other locations.

The machine 200 further includes a frame 207 operable to support the sheet of flexible material 204. The frame 207 further includes a transport device 212 operable to feed the sheet of flexible material 204 to various pouch forming stations such as a cutting stations 224, and 230, a sealing station 228, opening station 278, filling station 280, sealing station 282 and finishing station 286.

The machine 200 further includes a feeder device 242 and a roll of tape 243. The feeder device 242 is operable to feed the tape 243 to the frame 207. The tape 243 further includes tape a plurality of fitments 32 mounted onto the tape 243. Each of the plurality of fitments 32 is spaced a predetermined distance apart from the other and evenly spaced apart.

The machine 200 further includes a fitment insertion device 209. The fitment insertion device 209 is operable to remove and seal one of the plurality of fitments 32 from the tape 243 through the inner surface 204a of a respective aperture 204. In operation, the fitment insertion device 209 grabs a fitment 32 from the tape 243 and pushes the fitment 32 into an aperture 204. The feeder 242 continuously advances the tape 243 and the fitment insertion device 209 grabs the next available fitment 32 from the tape 243 and places the fitment 32 into the next available aperture.

The fitment insertion device 209 may be further operable to seal a portion of the fitment 32 onto the inner surface 204a of the sheet of flexible material 204 so as to place the remaining portion of the fitment 32 beyond the outer surface 204b of the sheet of flexible material 204. Thus, a portion of the fitment 32 is sealed with the inner surface 204a of a respective aperture 205, wherein the remaining portion of the fitment 32 extends beyond the outer surface 204b of the sheet of flexible material 204, as shown in FIGS. 6 and 9 when viewed collectively.

The machine 200 advances the flexible sheet 204 portion having the fitment 32 mounted in the aperture 205 downstream to a folding station 225 wherein the sheet of flexible material 204 is folded to form a pouch body. The machine 200 further advances the folded portion of the sheet of flexible material 204 downstream to the sealing and cutting stations 228, 230 wherein the folded portion of the sheet of flexible material 204 is sealed along the sides and cut to form a pouch 10.

Figure 4:
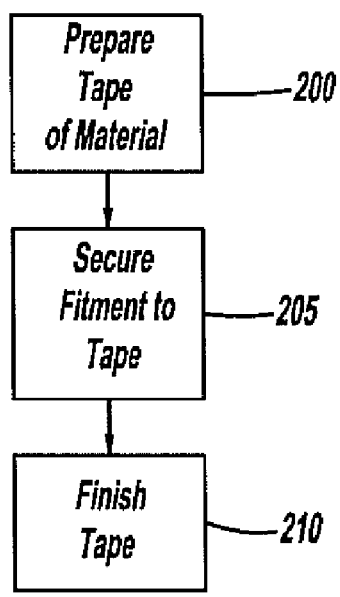
FIG. 4 is a flowchart of a method of applying a fitment to a tape, according to the present invention.

Referring to FIG. 4, a method of preapplying the spout fitment 32 to a tape of material 50 is provided. The method begins in block 170 with the step of providing a roll of tape material 50. The tape material 50 has a predetermined width, corresponding to the size and shape of the spout fitment 32 as well as the pouch 10 receiving the fitment 32. The tape material 50 is provided on a roll. The tape material 50 may be a laminate, and an outer layer of the material may include a sealant layer, for enhanced sealing of the tape material to the panel material at a predetermined temperature. For example, the tape material 50 may be a similar laminate as the pouch material, as previously described. A plurality of tape apertures 54 spaced a predetermined distance apart may be preformed in the tape material 50.

In block 175, as the tape material 50 is unrolled, and a spout fitment 32 is secured onto the roll of material, as shown in FIG. 6. The spout fitment 32 is provided using a feeder device 242, such as a bowl feeder. The fitment 32 may be inserted through the aperture 54 and the edge of the tape material surrounding the aperture 54 is secured around the fitment 32. In another example, the spout fitment 32 may be placed over the aperture in the tape and secured to the tape. An example of securing the fitment is a seal, such as a tack seal or a permanent seal or the like. Another example of securing the fitment is by an adhesive. Other ways of attaching the fitment to the tape are contemplated. Each fitment is spaced a predetermined distance apart on the material roll, such as corresponding to the plurality of apertures 54 formed in the tape material 50.

An intermediate portion 22 of the tape material 50 surrounding the spout fitment 32 may be defined using perforations 24. The perforations 24 in the tape material 50 facilitates removal of the intermediate portion 22 of tape material 50 for attachment to the pouch 10. The perforations 24 that define the intermediate portion 22 may have a predetermined shape to accommodate the size and shape of the pouch 10.

The methodology advances to block 180, and the roll of material with pre-applied fitment 56 is finished. For example, the pre-applied fitment roll may be rerolled for later use. Alternatively, the pre-applied fitment roll may be directly transferred to another machine such as a form machine, or a form-fill-seal machine or a fill-seal machine.

Figure 5:
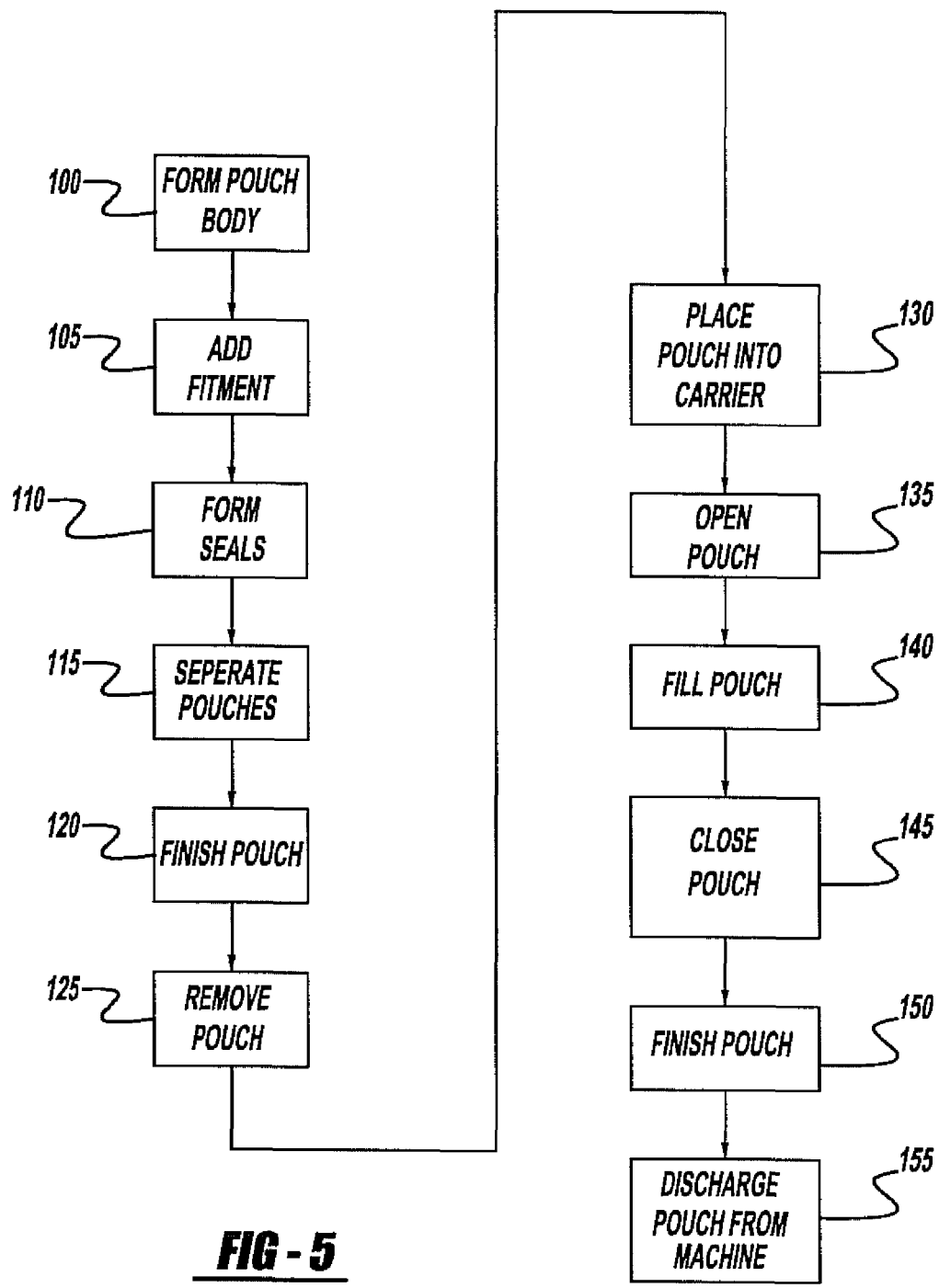
FIG. 5 is a flowchart illustrating a method of manufacturing the flexible pouch of FIGS. 1-3, according to the present invention.

Referring to FIG. 5, a method for forming, filling and sealing the flexible pouch 10 using a machine is illustrated. The machine may be a form machine, or a fill-seal machine, or a form-fill-seal machine. An example of a pouch forming machine is the Nishibe SMB500, SMB600 or SMB700. Another example is the Laudenberg form-fill-seal machine, FBM 10, 54, 20, 22. Advantageously, the spout fitment 32 is supplied with a tape of material in order to improve the process of forming a flexible pouch 10 with a fitment, as previously described.

The method begins in block 100 at a first forming station with the step of preparing the material 204 used to form the body of the pouch. For example, a roll of laminate material 204, as previously described, is unrolled along a horizontally oriented plane. The initial width of the roll of material 204 is determined by the desired finished size of the pouch 10 and the number of pouches obtained from the width. For example, two to four pouches, representing four to eight panels, can be obtained from a width of the roll of material on a two lane machine, three lane machine, four lane or more lane machine, respectively. The film may pass through an ultraviolet light chamber without reflection to remove pathogen and microbiological contaminants. The material is aligned. A precise alignment is advantageous, especially at a higher machine speed. For example, for provide a more precise seam tolerance and reduces the amount of material required. An example of an alignment method is disclosed in commonly assigned U.S. patent application Ser. No. 11/674,923, which is incorporated by reference.

For example, to align the material, the planar orientation of the unrolling material 204 is changed from a horizontal orientation to a vertical planar orientation. In an example, the machine 200 utilizes an angled roll bar to modify the planar orientation of the unrolling material. The vertical orientation is advantageous in aligning the unrolling material 204 prior to cutting. An optical reading means may be utilized, such as an optical scanner or the like to identify a predetermined location of the material, such as an edge of the material or a registration mark.

The determined alignment of the unrolling material may be used to automatically correct the alignment of the unrolling material. In this example, a moveable roller is utilized to adjust the alignment of the material along a vertically oriented axis. For example, the adjustment movement is ±2 degrees from the vertically oriented axis.

The material 204 may include preprinted information such as labeling information that describes the product contained within the pouch. In an example, the layer of preprinted information is located on an outer layer of the material. One layer of the material may also be preprinted with a tracking device 38, such as the RFID transmitter previously described. Alternatively, the RFID transmitter may be secured onto the material in a predetermined position, so that it is located in an air pocket when the pouch is formed during a later step.

The methodology advances to block 105, and the fitment is removed from a feeder device 242 and secured to the pouch 10. For example, the fitment 32 is removed from the pre-applied fitment roll 56 and secured to the panel 206. Advantageously, a plurality of fitments can be simultaneously applied to adjacent panels 206 of the material 204 across each of the lanes. A feeder device 242 provides the pre-mounted fitment or fitment 32 and tape of material 50, to the form machine. In an example, the material or tape 50 with the pre-applied fitment 56 unwound and fed in at a 90 degree angle to the unrolling panel material 204. In another example, the spout fitment 32 or the intermediate tape material 22 and spout fitment 32 are fed in and applied to the panel 206. The spout fitment 32, or spout fitment 32 and intermediate tape material 22, is positioned adjacent a predetermined fitment receiving portion of the panel as shown at 58. The predetermined fitment receiving location 58 could represent an upper, lower or side edge of the pouch or a surface of the pouch or the like. The fitment 32, or fitment 32 and intermediate tape material portion 22, are removed from the material roll 56 and sealed to the panel 206 of material. The perforations 24 defining the edge of the intermediate material portion 22 surrounding the spout fitment 32 facilitate removal of the fitment 32 and intermediate tape material 22 from the roll 56. The fitment 32 may be attached to the panel, and the attachment may be permanent or temporary. Various attaching techniques may be used to secure the fitment to the panel material. For example, a first fitment seal 62 may be a first low temperature, and first low pressure seal or a tack seal or the like. An edge of the intermediate material 22 surrounding the spout fitment 32 or the base portion of the fitment may be sealed to the panel material.

The material panel may be cut and positioned to form the front wall and a back wall of the pouch. Other features may also be added to the pouch as it is being formed. For example, a sidewall or gusset 26 may be inserted between the walls of the pouch. In another example, the gusset 26 or pleat is formed in the panel using a folding operation to fold the panel. The gusset may have a "V" shape, and in another example, the gusset has a "W" shape. A plurality of apertures 42 may be formed in the gusset, such as by using a punch. The plurality of apertures 42 may be positioned in the gusseted portion of the material, so as to reduce the amount of material in the gusseted portion of the pouch for sealing purposes. The tracking device 38 may be advantageously located within an airspace created by the aperture 42. In another example, a shaping means, such as an insert may be positioned between the walls of the pouch. The shaping means may be positioned at any edge, such as a lower edge of the pouch or an upper edge. More than one shaping means may be utilized to achieve a desired shape. Still another example of a feature is a vent valve inserted into one of the panels. In another example of a pouch 10 with one side seam, a fold may be formed along an edge in the sheet of material. An example of this type of pouch is disclosed in commonly assigned U.S. patent application Ser. No. 11/195,906, and U.S. Pat. No. 7,642,663 which are incorporated herein by reference.

In block 110, the pouch is permanently sealed. For example, the spout fitment 32 is sealed to the panel 206. The seal 60 may be applied to the fitment base 34 or formed along an outer edge of the intermediate material 22 surrounding the spout fitment. In an example, the first fitment seal 62, as previously described, may be applied. A second fitment seal 64 may be applied at a second higher temperature and a second higher pressure than that of the first seal 62. A third fitment seal 66 may then be applied over the second fitment seal 64. The third fitment seal 66 is a cool seal at a third lower temperature and third pressure than the first temperature and first pressure, such as to set the seal. Each of the first seal, second seal or third seal may be applied more than once. The seal may be applied using a seal bar, to be described. Various sealing techniques are known in the art to form each seal. The seals may be a heat weld formed by applying heat and compression, or an ultrasonic seal formed using vibrational energy, or a combination of heat and ultrasonic seals. It should be appreciated that a previous seal may be absorbed during the sealing process.

In addition, an edge of the pouch may be sealed prior, concurrent or after the fitment is sealed to pouch. For example, the side edges and lower edges of the pouch 10 may be sealed, leaving the upper edges open if the pouch is to be filled through the upper edge. All the edges may be sealed if the pouch is filled through the spout fitment 32. Other combinations are contemplated, depending on the type of fitment, product and filling technique. The side seal may be an overlap seal, whereby the side seal extends along the side edge of the panel and a predetermined distance along the upper edge. Another seal, such as the angled top seal 44, may also be applied at this time. Advantageously, the seals may be shaped so as to avoid sharp radiuses at the interior corners of the pouch. A rounded interior shape facilitates removal of the product. Various sealing techniques may be used to seal the edges, such as a heat weld, or ultrasonic seal, or combination as described herein.

A seal bar or forming plate may be used to apply any of the seals. An example of a seal bar is a generally rectangular member, as shown at 68. The seal bar may include a cavity 68a. The cavity 68a may be used to create an air pocket, or may conform to the shape of a member, such as the base portion 34 of the spout fitment 32. A tracking device 38 may be contained in the air pocket. In another example, the seal bar 68 or forming plate may have a plasma coating. One advantage of the plasma coating is that the line speed may increase. Another advantage is that the coating makes the surface of the seal bar or forming plate more resilient. When the seal bar 68 is heated, the coating expands due to this resiliency. The shear stress on the inner edge of the seal is reduced; resulting in reduced creepage of the material and greater durability of the seal. The plasma coating reduces the opportunity for potential damage to the material during the sealing step. In this example, the plasma coating is a smooth, hard plastic that mimics glass. Since the outer layer of material is not weakened, there is no creepage of the outer layer. This seal bar may also include the previously described seal bar cavity or recess.

In still another example of a sealing technique, the side seal is a two-step seal formed using more than one seal bar 68. One seal bar 68 may include the previously described seal bar cavity 68a for forming an air pocket in the sealed portion. An example of a two-step seal is disclosed in commonly assigned U.S. patent application Ser. No. 11/551,071. The two-step seal advantageously avoids the generation of ketones due to application of heat to the material. The first or inner seal is a low temperature seal. The second or outer seal is a high temperature seal. The second seal is spaced apart from the first seal by a predetermined distance, to create an air gap. The first seal is a tack seal, such as 6 mm wide, and is of a sufficient temperature so as to melt the layers of material and tack the edges together. The predetermined distance between the first and second seal is ½-1 mm. The second seal is applied at a higher temperature and pressure than the first seal. As a result, any gas, such as steam, ketones, aromatics or the like, is pushed in an outwardly direction, out through the open edges of the panels, and not into the pouch. Thus, the first seal prevents entry of contaminates into the pouch to avoid organoleptic contamination.

The heat weld may include a heat weld followed by a cold weld.

The methodology advances to block 115, and the individual pouches formed in the roll width of material are separated from each other in a cutting operation. For example, each section of material may be first separated along its width, i.e. along the side seams of the pouches. The section is then is separated into individual pouches along a cutting line. In this example, the width of unrolling material represents the side edges. The material is cut into a pouch 10 using a known cutting apparatus, such as a laser or punch or the like. The cutting apparatus imparts a single cut in the material to separate the pouches. The size of the pouch 10 is controlled by the distance between the cuts. For example, a width of the web of material may contain three pouches. A single widthwise and lengthwise cut separates the web into individual pouches. Alternatively, two rows of pouches are cut out at one time by adding a double cut between two lengthwise cuts, preferably in the center. Advantageously, forming two pouches during the cutting operation effectively doubles the assembly line speed.

In a further example, two consecutive pouches 10 may be separated using a double cutting process, whereby two cuts are made at the same time to separate the upper and lower edges of two pouches at the same time from the sheet of material. Advantageously, forming two pouches during the cutting operation effectively doubles the assembly line speed.

It should be appreciated that the upper edge or lower edge may be further trimmed such as for the pouch to acquire a predetermined shape. The pouch corners may be shaped to have a radius, to eliminate right angles at the corners. A hanging aperture 46, if present, may be formed at this time. This operation may be performed using a cutter or a die cut or the like.

In another example of a finishing operation, a crease or guide pocket 80 may be formed in a top portion of each wall 12, 14 in a creasing operation, in order to facilitate opening and filling of the pouch. An example of a method of forming a crease in a wall to facilitate opening the pouch is disclosed in commonly assigned U.S. patent application Ser. No. 10/310,221, which is incorporated herein by reference. It should be appreciated that the shape of the finished pouch is non-limiting, and may be round, square, oval, triangular or the like. In still another example of a finishing operation, the sleeve is applied over the individual pouch and shrunk to fit using an application of heat to the pouch. In a further example of a finishing operation, a rib 96 may be added to the pouch. The rib may be thermoformed, and may provide the pouch 10 with shape or structure.

The methodology advances to 125, and the formed pouch 10 is removed from the form line, and is ready for filling. It should be appreciated that the fill-seal machine may be integral with the pouch forming machine, or may be a separate machine. The unfilled pouch may be loaded into a carrier and the carrier is transferred to a fill-seal machine. The unfilled pouch may be directly placed on a fill-seal line using a transfer means. An example of a transport means is disclosed in commonly assigned U.S. patent application Ser. No. 11/829, 401, which is incorporated herein by reference.

In block 130, the pouch is placed on a fill-seal line. For example, a line worker could pick up the pouch 10 and place it in a carrier 260 on the fill-seal line 270. In another example, a robotic transfer device 252 is used to transfer the pouch from the form line 210 to the fill-seal line 270. The robotic transfer device 252 can be a robotic device having an arm 254 and a gripping device 256 that picks up an individual pouch from the form line 210 and places it in a pouch carrier 260 that moves between the fill-seal stations. An example is disclosed in commonly assigned U.S. patent application Ser. No. 11/829,401, which is incorporated herein by reference. Various types of pouch carriers 260 are available, such as a holder 262 or a gripper or the like. An example of a holder is a cup-shaped member, as disclosed in commonly assigned U.S. Pat. No. 6,719,015, which is incorporated herein by reference. Alternatively, the pouch 10 may be held using grippers as is known in the art. The gripper may hold the pouch along the edge. The pouches are arranged on the carrier in a predetermined manner.

The methodology advances to block 135 and the pouch 10 is opened in an opening operation. Various techniques are conventionally known in the art for opening the pouch 10. For example, heated air, such as between 120-140° F., may be directed into the pouch through the spout. In another example, the guide pocket 80 formed by the crease in the front wall 12 and back wall 14 facilitates opening of the pouch. After the pouch 10 is initially opened, a nozzle may be mechanically lowered into the guide pocket to direct a stream of compressed gas into the guide pocket, to force the walls of the pouch 10 away from each other and further open the pouch. An example of a gas is carbon dioxide or nitrogen. The blowing station may include a manifold, with a hood extending over the top of the edges of the pouch as known in the art. The manifold has rows of apertures formed above the upper edges 16 of the pouch 10. The hood is placed over the pouch 10 to assist in maintaining the air pressure in the pouch 10. The supply of pressurized gas is directed through the aperture to form a plurality of jets of pressurized gas or air. The jets are directed downwardly at the diamond-shaped openings formed at the upper edges 16 to assist in overcoming the surface tension of the pouch and assist in separation of the walls 12, 14. A diving rod (not shown) may then be used to make sure the pouch 10 is fully opened. After the pouch is opened, it may be injected with super-saturated steam to eliminate any pathogens or the like.

In block 140, the pouch 10 is filled with the product in a filling operation. The pouch may be filled through an open edge, or through the fitment, as previously described. If the pouch is large, the pouch may be filled at more than one station. For example, a fill tube 281 is lowered into the opened pouch 10 and the product is dispensed into the open pouch 10. The fill tube may be raised at a predetermined rate as the product is dispensed. For example, the fill tube may be raised just ahead of the filling product.

If the product is naturally carbonated, such as a sparkling wine or the like, the pouch is preferably filled while immersed in a nitrogen or carbon dioxide atmosphere. If the product is not naturally carbonated and carbonation is desirable, it is immersed in a carbonator to introduce carbon dioxide into the product. For example, carbon dioxide is introduced into cold water or juice to provide a carbonated beverage. The product may contain a mixture of up to four volumes of carbon dioxide. It should be appreciated that the carbon dioxide masks any undesirable taste from ketones and other solvents released during the sealing process. The carbon dioxide also increases the pressure within the product so that the walls of the pouch are rigid after the top is sealed. The product is preferably filled at a temperature ranging from 29° F. to ambient temperature. The filled pouch may have the oxygen removed from the pouch. For example, the pouch may be flushed with carbon dioxide. Any gas in the head space of the pouch is removed. For example, oxygen may be removed by applying a vacuum.

In block 145, the pouch is sealed. Various techniques are available for sealing the pouch 10. The seal technique depends on the product contained in the pouch, the pouch shape, or type of opening means or how the pouch is filled. For example, a closing seal may be a heat weld, or an ultrasonic seal or ultra pulse seal as previously described.

For example, if the pouch is filled through the open edges with a carbonated product, or product having an alcoholic content, the open edges of the pouch are closed by applying a first closing seal 70. The first closing seal 70 may be an ultrasonic seal, or an ultra pulse seal. An example of a closing seal for a pouch containing a carbonated beverage is described in commonly owned U.S. Pat. No. 6,863,216 which is incorporated herein by reference.

A second closing seal 72 may be applied a predetermined distance apart from the first seal 70. The second seal 72 may be a heat weld or a cosmetic seal or an ultrasonic seal or the like. For a carbonated product, the location of the second seal 72 is selected so that some of the product is trapped between the first and second seals 70, 72. This is advantageous since eliminates the potential for gas in the head space, i.e. the region between the product and the heat seal. The second seal is spaced outboard of the first seal. Another advantage of the location of the second seal 72 is that the overall length of the pouch may be reduced, resulting in less pouch material. In a further example, the first closing seal 70 is a tack seal, and the second closing seal 72 is a high pressure, high temperature seal. A cosmetic seal may be applied with respect to the first and second closing seals, or the second seal 72 may be a cosmetic seal. In an example of an overlap seal, the closing seal 72 extends a predetermined amount over the side seal along the upper edge.

In yet another example, the pouch 10 is filled through the spout fitment 32 and the cap 30 is applied the spout 36 to close the pouch 10. The cap 30 contains the product in the filled pouch, to prevent leakage of the product from the pouch 10. The cap 30 may be a tamper-evident cap for a carbonated product. For a carbonated product, the complementary arrangement of threads and grooves in the cap and spout provides for the controlled release of pressure from the pouch, as disclosed in commonly assigned U.S. patent application Ser. No. 11/195,906, which is incorporated herein by reference.

The methodology advances to block 150 and the pouch 10 is finished in a finishing operation. For example, the edges of the pouch 10 may be trimmed to achieve a predetermined shape. In addition, the pouch 10 may be cooled at a cooling station, where the pouch 10 is cooled using a conventionally known cooling technique. Optionally, the sleeve may be placed over the filled pouch and shrunk to fit over the pouch by applying heat. The sleeve layer forms an outer layer of the pouch. The methodology advances to block 155.

In block 155 the filled pouch 10 is discharged from the machine. A plurality of pouches may be placed in a package for sales or shipping purposes. It is contemplated that the order of implementing the steps may vary to facilitate the manufacturing process.

Figure 10:
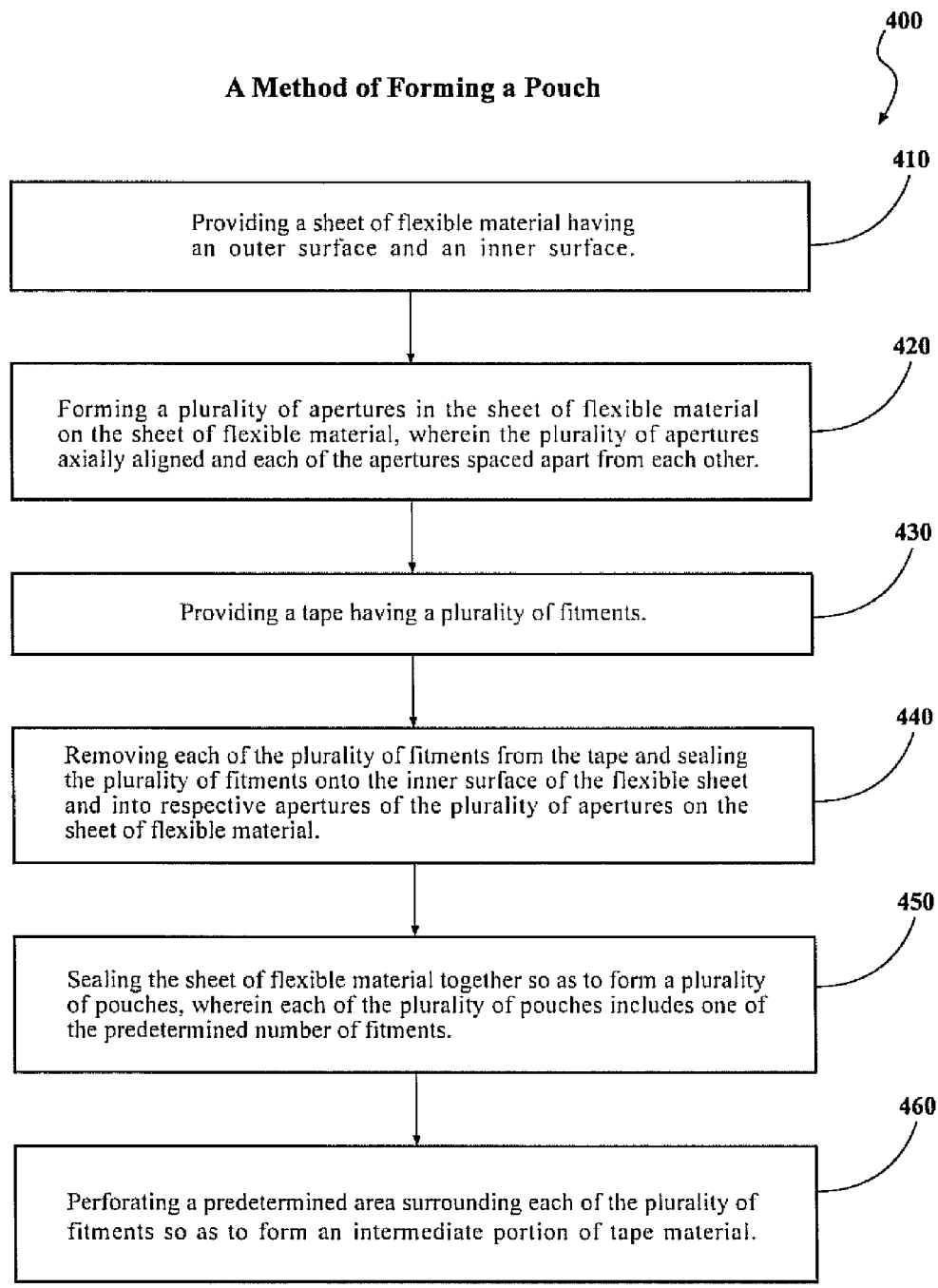
FIG. 10 is a flow chart illustrating a method of forming a pouch.

Referring now to FIG. 10 a method of forming a pouch 10 having a fitment 32 mounted to the inner wall of the pouch body is provided. The method begins at block 400 wherein a sheet of flexible material 204 is provided. The sheet of flexible material 204 has an outer surface 204*b* opposite an inner surface 204*a*. The inner surface 204*a* forms the inner portion of the pouch body. The outer surface 204*b* forms the exterior surface of the pouch 10.

The method proceeds to step 410 where a plurality of apertures 205 are formed in the sheet of flexible material 204. The plurality of apertures 205 are axially aligned with respect to each other and evenly spaced apart. The plurality of apertures 205 is formed where the fitment 32 of a respective pouch 10 is mounted. For example, in instances where the fitment 32 is mounted near the bottom edge of the pouch 10, the plurality of apertures 205 is aligned along an edge of the sheet of flexible material 204.

The method proceeds to step 420 wherein a tape 243 is provided. The tape 243 includes a plurality of fitments 32. Each of the plurality of fitments 32 is evenly spaced apart from other. The method proceeds to step 430 wherein each of the plurality of fitments 32 is removed from the tape 243. Each fitment 32 is sealed to a respective aperture 205 in the sheet of flexible material 204. Specifically, the fitments 32 are sealed onto the inner surface 204*a* of the sheet of flexible material 204. Each fitment 32 is pushed through a respective aperture 205 so that the fitments 32 extend beyond the outer surface 204*b* of the sheet of flexible material 204.

The method proceeds to step 440 wherein top, bottom and side edges of a pouch 10 is formed by sealing the sheet of flexible material 204 together. Preferably the sheet of flexible material 204 is folded so as to form a pouch. Sealing bars 224 may be pressed together sealing a portion of the pouch so as to form respective top, bottom and side edges. Each of the plurality of pouches includes one of the predetermined number of fitments 32.

The method may further include steps to help facilitate the forming of the pouch 10. For instance the method may include the step of perforating a predetermined area surrounding each of the plurality of fitments so as to form an intermediate portion of tape material. The intermediate portion of tape material is removed with each of the plurality of fitments so as to be sealed within each of the plurality of pouches.

Figure 8:
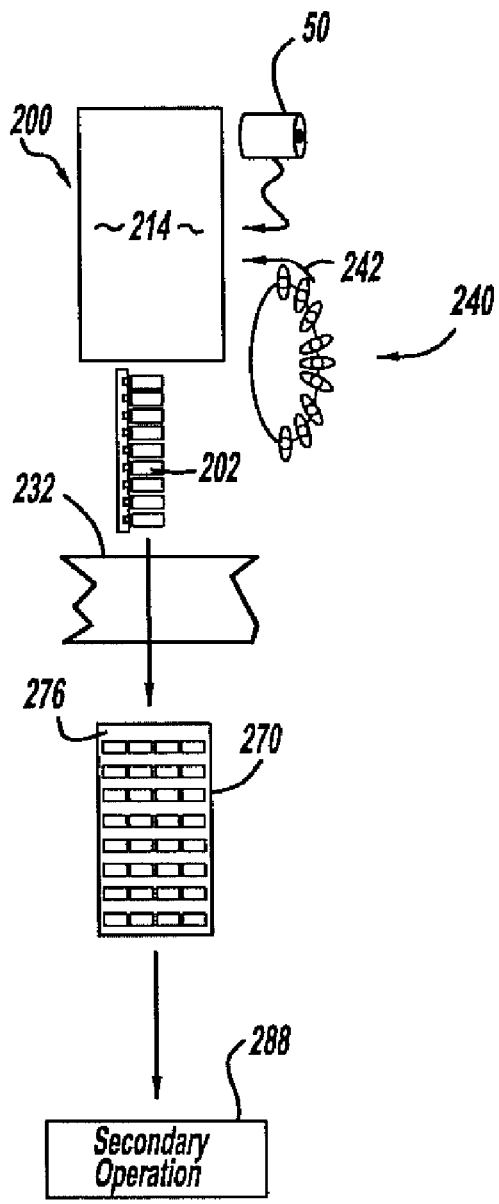
FIG. 8 is a diagrammatic view illustrating a machine for forming the flexible pouch of FIGS. 1-3, according to the present invention.

Referring to FIGS. 8-9, a machine 200 for carrying out the method described with respect to FIGS. 4 and 5 is illustrated. Various styles of machines 200 are contemplated for forming or filling and sealing the pouch 10, such as a flat bed, conveyor or the like. An example of such a machine is manufactured by Nishibe, such as the model number SBM500. SMB600 or SMB700. The machine may include a form line 210 and/or a fill line 270. It should be appreciated that a particular manufacturing station may perform one or a plurality of operations, to enhance the efficiency of the methodology and apparatus.

The machine includes a base 216 and a transport device 212 that transports the material through the various stations. An example of a transport device is a conveyor or a turret or the like. The roll of material 204 is mounted along a horizontally oriented axis, and is unrolled along at a material feed station.

The unrolling material passes through an alignment station 218 to align the material. For example, at the alignment station 218, the material rolls pass through an optical reader, and the optical reader reads a predefined point with respect to the material 204. This predefined point may be a registration mark on the material, or the edge of the material 204. The machine 200 utilizes the registration marks to automatically adjust the orientation of the unrolling material position along an axis. For example, rollers 220 are used to adjust the position of the unrolling material ±2 degrees relative to a vertically oriented center axis.

The material is moved to a fitment application station 240 and the spout fitment 32 is applied to the unrolling material 204. The machine includes a feeder device 242, which supplies the fitment and tape to the machine. In this example, a feeder mechanism supplies the unrolling material roll with pre-applied fitment 56 at a 90 degree angle to the direction of material 204 flow. In another example known in FIG. 8, the fitments are supplied from a feeder bowl and the tape of material 50 is applied separately. In still another example, a fitment is supplied from the feeder bowl. The fitment 32 is positioned on the panel and secured to the panel. The fitment may be secured using a first seal 62 at a first low temperature and first low pressure. The first seal 62 may be a tack seal. As previously described, the intermediate material 22 surrounding the fitment 32 may be sealed to the panel, or the base portion of the fitment. It should be appreciated that the spout fitments may be simultaneously applied across all lanes in the predetermined panel location 58 for each spout fitment 32 on each panel 206 corresponding to a lane. For example, in a 10 lane machine with 10 panels, arranged in a linear line of 10, 10 fitments are simultaneously sealed to the material. At a rate of 50 strokes per minute, 500 fitments per minute may be applied to the unrolling material.

The machine includes a cutting station 224 where the material is cut into a predetermined number of sections. For a pouch made from two panels of material, one of the sections is rotated 180 degrees, and the first and second sections of this example are positioned such that inner sides face one another. The sections are used to form the front panel and back panel of the pouch, respectively.

It should be appreciated that a feature, as previously described, may be added between the facing sheets at an appropriate station, such as the insert station. The facing sections are transferred along the conveyor to a sealing station.

The seals are applied to seal the pouch at a sealing station 228. In an example, the seal may be applied to the fitment base 34. In another example, the seal may be formed along an outer edge of the intermediate material 22 surrounding the spout fitment. In still another example, a tape of material 50 is positioned along the seal area where the spout fitment will be located. A seal bar 68 may be utilized to apply the seal. In this example, there are two seal bars that oppose each other, on opposite side of the spout fitment. Each seal bar 68 includes a cavity 68a surface that corresponds to the shape of the base portion of the spout fitment 32. The base portion 34 of the spout fitment 32 is positioned between the seal bars 68, so that the contour of the spout fitment corresponds to the cavity 68a. The first fitment seal 62 may be applied, if not previously applied. A second fitment seal 64 may be applied at a second higher temperature and second pressure than the first fitment seal 62. A third fitment seal 66 at a third temperature and third pressure that is lower than the first temperature and pressure or second temperature and second pressure may then be applied over the second fitment seal 64. The third fitment seal 66 is a cool seal, such as to set the seal. It should be appreciated that any of the seals may be applied more than once. The intermediate material 22 surrounding the fitment base portion 34, or material tape 50 positioned adjacent the fitment base portion 34, fills any voids within the seal bar cavity, so as to eliminate any potential gap between the seal bar 68 and the spout fitment 32. As a result of the elimination of any gaps, leakage between the spout fitment 32 and the panel is prevented. Various sealing techniques are known in the art, and the seals may be a heat weld formed by applying heat and compression, or an ultrasonic seal formed using vibrational energy, or a combination of heat and ultrasonic seals. In addition, a previous seal may be absorbed during the sealing process.

The sealing station 228, as previously described, also forms the seams joining the edge of each panel to delineate each pouch. In this example, the side edges of each of the pouches along the width of material are heat-sealed in this operation. Because of the precise alignment of the material sheets, the width of the side edge seam may be reduced, such as 4 mm, with a tolerance of ±1 mm. The ribs may also be added at the sealing station.

The material is moved along the conveyer to a cutting station 230 and the material is cut into individual pouches. For example, the pouch is cut along the side seam. The pouch is then cut along the upper edge and lower edge. The cut may be a double cut, so as to separate two pouches at one time.

The transport device then transfers the individual pouches to an unloading station 232, wherein the individual pouches are removed and placed into a receptacle, such as a holder 260, or magazine or the like. It should be appreciated that the pouches 10 are fully formed.

The pouches are now ready for filling. It should be appreciated that the pouches may be filled and sealed on another machine, or at fill-seal stations associated with the above described machine.

The line speed between the form line 210 and the line 270 can be coordinated, and such coordination may increase the overall pouch production rate. In the example of FIG. 9, the line speed of the form line 210 is coordinated with the fill-seal line 270 to output filled pouches at a predetermined rate. The fill-seal line 270 includes a pouch carrier 260 that simultaneously moves a plurality of pouches, arranged in a predetermined manner, such as transversely in a row, through each of the stations in the fill-seal line. The pouch carrier 260 is operatively connected to a transport device 272, as previously described, that moves with respect to a second frame 274. For example, eight pouches arranged transversely are filled and sealed at a time to improve the efficiency of the machine 200.

The stations 276 of the form-fill line 270 of the machine 200 may be arranged in a linear manner, such as on a linear transport table. Further the pouches may be arranged in a circular manner, such as on a rotational transport table. The linear stations may be further arranged transversely or vertically.

The fill-seal line 270 of the machine 200 includes an opening station 278, in order to separate the upper edges of the pouch. Various techniques are conventionally known in the art for further opening the pouch 10. For example, suction cups or grippers or the like may be utilized to open the pouches. A stream of heated air may be directed toward the upper edges of the pouch, or through the spout. In addition, a nozzle may be mechanically lowered into the pouch 10 to direct a stream of compressed gas downwardly into the pouch to force the walls of the pouch 10 away from each other to further the pouch. An example of a gas is carbon dioxide or nitrogen.

In addition, the opening station 278 may include a manifold, with a hood extending over the top of the edges of the pouch. The manifold has rows of apertures (not shown) formed above the upper edges of the walls of the pouch. The hood is placed over the pouch to assist in maintaining the air pressure in the pouch. The supply of pressurized gas is directed through the aperture to form a plurality of jets of pressurized gas or air. The jets are directed downwardly at the diamond-shaped openings formed at the upper edges to assist in overcoming the surface tension of the walls and assist in separation of the walls. A diving rod may then be used to make sure the pouch is fully opened. Steam or another type of sterilizer may be utilized to clean an inside wall of the opened pouch.

The opened pouch moves to a filling station 280, and the pouch is filled with the product. For example, a nozzle dispenses a predetermined amount of product into the opened pouch. The product may be dispensed into the opened edges of the pouch or through the spout. In this example, the fill nozzle is lowered into the opened pouch, and the product is dispensed into the open pouch. The nozzle is raised at a predetermined rate corresponding to the rate of filling the pouch, to keep the product in the pouch and avoid overspray. Depending on the size of the pouch, there may be additional fill nozzles.

If the product is naturally carbonated, such as beer or soda or the like, the pouch is preferably filled while immersed in a nitrogen atmosphere. If the product is not naturally carbonated, it is immersed in a carbonator to introduce carbon dioxide into the product. For example, carbon dioxide is introduced into cold water or juice to provide a carbonated beverage. The product may contain a mixture of up to four volumes of carbon dioxide. It should be appreciated that the carbon dioxide masks any undesirable taste from ketones and other solvents released during the sealing process. The carbon dioxide also increases the pressure within the product so that the walls of the pouch 10 are rigid after the top is sealed. The product is preferably filled at a temperature ranging from 29° F. to ambient temperature. The carbonation is advantageous as a microbiocide which can enhance the flavor or prevent mold or contamination.

The pouch 10 may move to a gas removal station for removing any oxygen from the pouch. Various techniques are known in the art for removing the gas. This can be done by providing a hood or diving nozzle where oxygen is either evacuated or replaced with carbon dioxide or nitrogen into the pouch to displace the oxygen. A diving nozzle is used to inject the gas or liquid nitrogen.

The pouch is then transferred to a sealing station 282 and if filled through the open edges of the pouch, the open edges of the pouch are sealed using a closing seal. The closing seal may be a thermal seal. For example, a heat sealing member extends through the slots in the sides of the cup to seal the upper edge of the pouch. As previously described, the heat sealing member may have a plasma coating. In another example, the lifting surface ends, causing the lever arms to return to their original position, and the pouch to close. The filled pouch may return to a partially closed position due to the product contained therein.

Another example of a closing seal for a product utilizes an ultrasonic sealing process that includes a first closing seal 70. The ultrasonic seal may include sound waves and is formed using a horn and anvil. A second closing seal 72, if utilized, is applied at a second sealing station 284. The second closing seal 72 may be applied using a heat seal means to form a second heat seal spaced apart a predetermined distance from the first closing seal 70. It should be appreciated that the second closing seal 72 may be spaced slightly outboard of the first closing seal 70. The second heat-sealing station is conventional and utilizes heat or a combination of heat and pressure to form the seal. The second closing seal 72 may also be a cosmetic seal or another type of seal, such as ultrasonic, ultra pulse or the like. The first and second seals are applied for a carbonated product as disclosed in commonly assigned U.S. Pat. No. 6,863,216, which is incorporated herein by reference.

If the pouch 10 is filled through the spout fitment 32, the pouch 10 is closed by securing a cap 30 to the spout 36. The cap 30 may have a tamper-evident feature. In addition, the cap 30 may contain a tracking device 38.

The pouch 10 is transferred to a finishing station 286 for finishing and removal from the filling machine 270. For example, a hanging aperture 46 may be formed at this time. In another example of a finishing operation, the edges of the pouch 10 are trimmed to achieve a desired shape.

The machine may include a removal station 288 for removing the pouches 10 from the machine 270. A gripper may be utilized to transfer the pouches. The grippers grab the pouch and lift the pouch from the pouch carrier 260. The carriers 260 may then be moved by the conveyor through a rinsing station and returned to the other side of the machine 270 for reuse.

The finished pouches 10 may be transferred to a packaging machine. For example, grippers may be utilized to move the finished pouches. In an example, the packaging machine may be integral with the form-fill-seal machine or a separate line.

It should be appreciated that the automated machine 200 may include other operations. For example, the filled pouch may be transferred to another transport device, or otherwise collected. Alternatively, other stations may include a straw pierceable opening station, an upstream oxygen purging station, downstream oxygen purging station, or the like.

If desired, the pouch may be transferred to a pasteurization station. Pasteurization enhances the shelf life of the product. The pouch is inserted into an enclosed chamber. For example, a combination of steam and water is used to heat the pouch to a predetermined temperature for a predetermined period of time to pasteurize the product contained within the pouch. The package is then cooled. In this example, recirculated water surrounds the pouch cool the pouch. In certain instances, it may be desirable to apply steam to sterilize the pouch 10 and to wet the inner surface of the walls to facilitate handling.

The present invention has been described in an illustrative manner. It is to be understood that the terminology which has been used is intended to be in the nature of words of description rather than of limitation.

Many modifications and variations of the present invention are possible in light of the above teachings. Therefore, the present invention may be practiced other than as specifically described.

The invention claimed is:

1. A machine for forming a flexible pouch from a sheet of flexible material, the sheet of flexible material having an inner surface and an outer surface, the sheet of flexible material including a plurality of apertures axially aligned along the sheet of flexible material, each of the plurality of apertures evenly spaced apart from each other, wherein the flexible pouch includes a fitment, the machine comprising:

a frame supporting the sheet of flexible material;

a tape having a plurality of fitments mounted onto the tape, each of the plurality of fitments spaced a predetermined distance apart from the other;

a feeder device operable to feed the tape to the frame; and a fitment insertion device operable to remove and seal one of the plurality of fitments from the tape through the inner wall surface of a respective aperture of the plurality of apertures on the sheet of flexible material, the fitment insertion device sealing a portion of the one of plurality of fitments with the inner surface of the sheet of flexible material so as to place the remaining portion of the one of plurality of fitments beyond the outer surface of the sheet of flexible material.

2. The machine as set forth in claim 1, wherein each of the plurality of fitments is sealed within each of the plurality of pouch bodies by applying a first seal at a first temperature and a first pressure, a second seal at a second temperature and a second pressure, a third seal at a third temperature and a third pressure, wherein the second temperature and the second pressure are greater than the respective first temperature and first pressure, and wherein the third temperature and third pressure are less than the respective second temperature and second pressure.

3. The machine as set forth in claim 2, wherein the tape includes a plurality of intermediate portions, each of the plurality of intermediate portion fixedly attached to each of the plurality of fitments, and wherein each of the plurality of intermediate portions is removed from the tape with each of the plurality of fitments so as to be sealed within each of the plurality of pouch bodies.

4. The machine as set forth in claim 3, wherein each of the plurality of intermediate portions includes a plurality of perforations interconnecting each of the plurality of intermediate portions to the tape so as to facilitate the removal of each of the plurality of intermediate portions from the tape.

5. The machine as set forth in claim 2, wherein the tape is configured in a roll.

6. The machine as set forth in claim 2, wherein each of the plurality of fitments is tack sealed to the tape.

7. The machine as set forth in claim 2, wherein the first, second, and third seals are heat welds.

8. The machine as set forth in claim 2, wherein the first, second, and third seals are ultrasonic seals.

9. The machine as set forth in claim 2, wherein the first, second, and third seals each include a heat weld and an ultrasonic seal.

10. The machine as set forth in claim 1, further including a fill-seal device located downstream a pouch forming device operable to seal the sheet of flexible material together so as to form a plurality of pouch bodies, the fill-seal device operable to fill and seal each of the plurality of pouch bodies.

11. The machine as set forth in claim 10, further including a transfer device operable to transfer each of the plurality of pouch bodies from the pouch forming device to the fill-seal device.

12. A method of forming a pouch, the method comprising the steps of:

providing a sheet of flexible material, the sheet of flexible material having an outer surface and an inner surface;

forming a plurality of apertures in the sheet of flexible material, the plurality of apertures axially aligned and each of the apertures spaced apart from each other;

providing a tape having a plurality of fitments;

removing each of the plurality of fitments from the tape and sealing the plurality of fitments onto the inner surface of the flexible sheet and into respective apertures of the plurality of apertures on the sheet of flexible material; and sealing the sheet of flexible material together so as to form a plurality of pouches, wherein each of the plurality of pouches includes one of the predetermined number of fitments.

13. The method as set forth in claim 12, further including the steps of perforating a predetermined area surrounding each of the plurality of fitments so as to form an intermediate portion of tape material.

14. The method as set forth in claim 13, wherein the intermediate portion of tape material is removed with each of the plurality of fitments so as to be sealed within each of the plurality of pouches.

* * * * *